Feb. 26, 1935.  E. LEITZ, JR  1,992,534
COMBINATION DISTANCE METER AND TELESCOPE RANGE FINDER
Filed Jan. 6, 1934
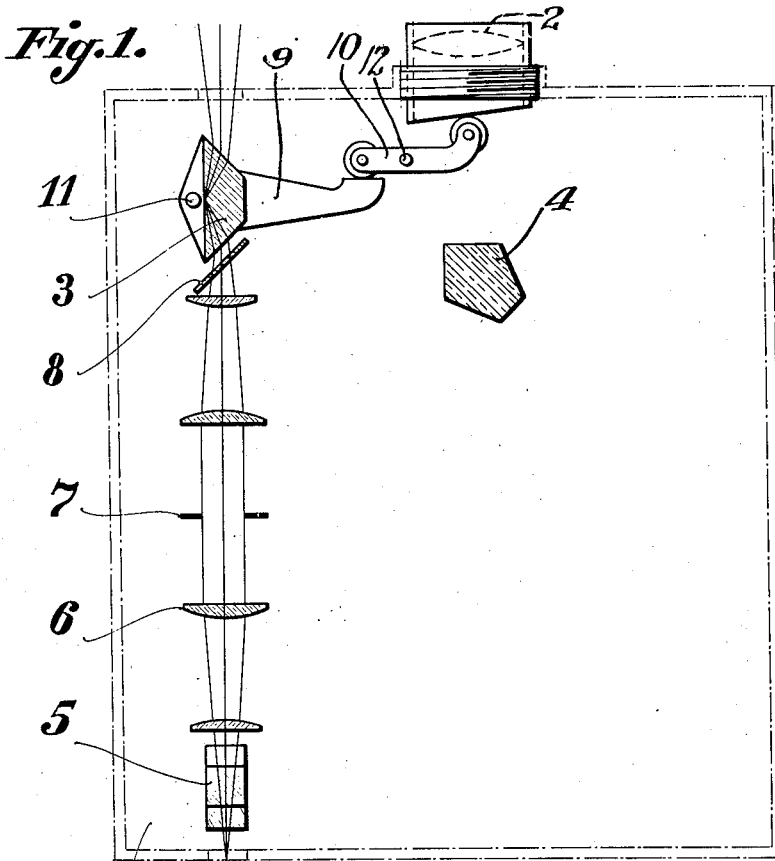
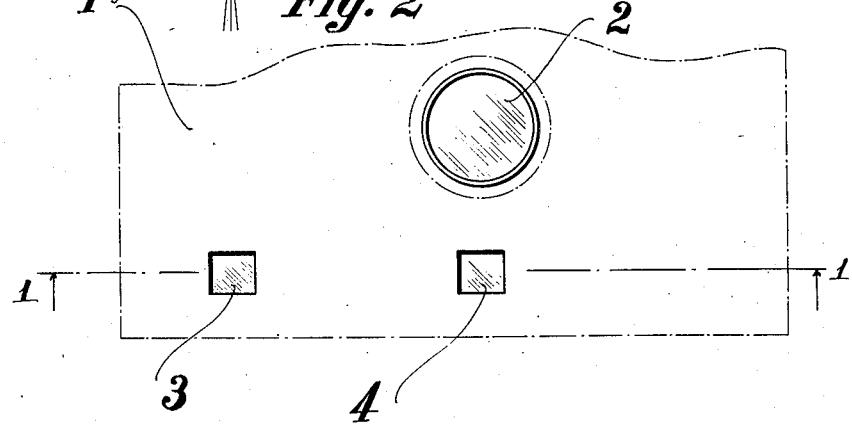
INVENTOR
Ernst Leitz, jr.
BY
ATTORNEY Patented Feb. 26, 1935

1,992,534

UNITED STATES PATENT OFFICE 1,992,534

COMBINATION DISTANCE METER AND TELESCOPE RANGE FINDER

Ernst Leitz, Jr., Wetzlar, Germany, assignor to Ernst Leitz, Optische Werke, G. m. b. H., Wetzlar, Germany Application January 6, 1934, Serial No. 705,493
In Germany January 7, 1933

1 Claim. (Cl. 95—44)

This invention relates to the combination of a base distance meter and a telescope range finder in cameras, and it is the principal object of my invention to provide an arrangement by means of which the dimensions and weight of a camera can be reduced to avoid the disadvantages connected with the use of similar cameras as pointed out herebelow.

It is known to unite camera telescope range finders with adequate shutters and distance meters, if however in such arrangement the necessary inversion of the images is effected, the following disadvantages are present, first the elements for producing the inversion of the image at great image angle of the range finder within the telescope must evidently be of comparatively large dimensions, which unnecessarily increase the dimensions and weight of the camera in which said finders and meters are located, and secondly necessitates an undue increase in the number of mirrors, so as to cause losses in light rays. It is also known to use Dove's prisms however the combination of both arrangements, the Dove prism arrangement, and the combined arrangement of the distance meter and telescope range finder in the peculiar manner according to my invention will avoid all the above outlined disadvantages, as such a combination permits of the use of such inversing mirror elements by their arrangement as elements for finding the distance, and by locating the eyepiece of the finder in the prism, the same can be made of relatively small dimensions, notwithstanding the relatively large image angle without the danger of vignetting in the finder, thus producing a saving in space and weight of the camera by the omission of additional mirrors or the like.

These and other objects and advantages of my invention will become more fully known as the description thereof proceeds and will then be specifically defined in the appended claim.

In the accompanying drawing forming a material part of this disclosure:

Fig. 1 shows diagrammatically a combination distance meter and telescope range finder with the prism in horizontal section and the other optical elements in section on line 1—1 of Figure 2.

Fig. 2 is a fragmentary front elevation of a camera equipped with a device constructed according to my invention.

In a casing 1 suitably arranged within a camera, an objective 2 is located in its tubular mounting. A Dove prism 3 is turnable on its seat 9 about pivot 11 and a lever 10 pivoted intermediate its ends, as at 12 in the camera wall, engages with its other end the mounting of objective 2. A semi-transparent mirror 8 is arranged in alignment with the prism 3 behind the same and a telescope range finder with an adequate shutter or diaphragm 7. Between the eyepiece and the ocular of the telescope another Dove prism 5 is provided, arranged at an angle of 90° to the prism 3 and turnable about its longitudinal axis.

In the immediate vicinity of the axis of the objective is located in vertical alignment with the mirror 8 a pentaprism 4.

The device operates as follows:

The bunch of light rays entering in a straight line is reversed by the Dove prism 3 in one direction, for instance the vertical. By the transmission of the movements of the objective 2 via lever 10, the prism, and the path of the light rays are diverted to produce coincidence with the rays passing through the pentaprism 4. This part image has experienced an analogous inversion in the pentaprism and is mixed by means of the semi-opaque or semi-transparent mirror 8 with the image in the straight line of vision. The objective of the telescope range finder presents in the plane of diaphragm 7 a real and adequate intermediary representation of the mixed image which is observed through the ocular across the Dove prism 5. This prism 5, on account of its positioning with respect to prism 3, will produce a further inversion of the image for instance in the horizontal so that the observer sees a laterally and altitudinally correct image.

It will be understood that I have described and shown the preferred form of my invention as one example only of the many possible ways to practically construct my device and that I may make such changes in the general arrangement of my device and in the construction of the minor details thereof as come within the scope of the appended claim without departure from the spirit of my invention and the principles involved.

Having thus described my invention, what I claim as new and desire to secure by Letters Patent is:

In a device of the character described, the combination of a distance meter with a telescope range finder, a semi-transparent mirror for said distance meter, a Dove prism in the direct line of vision of the distance meter, a pivoted seat for said prism, a lever pivoted intermediate its ends and engaging with one end said prism seat and with its other end an objective mounting, a second Dove prism in said range finder between its eyepiece and ocular at an angle of 90° to said first named Dove prism, and a pentaprism in the immediate vicinity of the objective axis and in vertical alignment with the mirror of said distance meter.

ERNST LEITZ, Jr.